Figure 1:
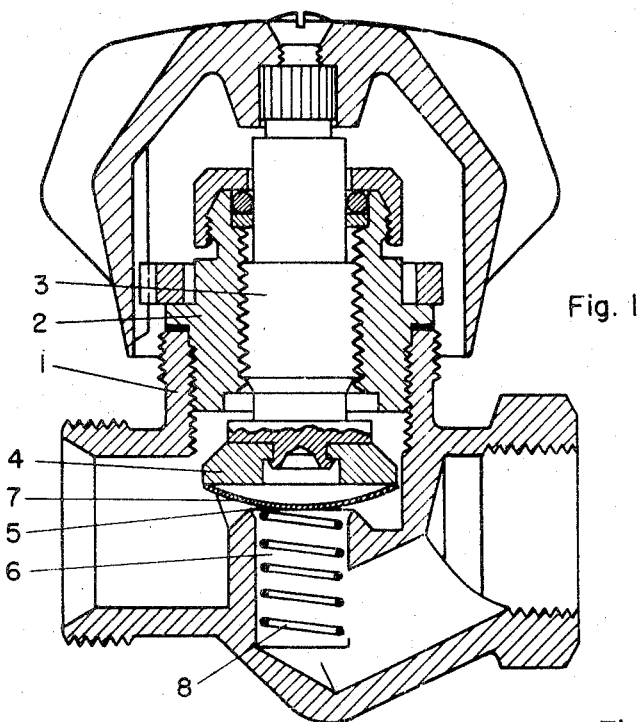

Dec. 13, 1966     O. LUNDBERG     3,291,445
RESILIENT VALVE DISC
Filed May 7, 1964

INVENTOR
OLOF LUNDBERG

BY *Larson and Taylor*

ATTORNEYS

United States Patent Office 3,291,445
Patented Dec. 13, 1966

3,291,445
RESILIENT VALVE DISC
Olof Lundberg, Hagersten, Sweden, assignor to AGA-Platforadling Aktiebolag, Halsingborg, Sweden, a corporation of Sweden
Filed May 7, 1964, Ser. No. 365,827
Claims priority, application Sweden, May 31, 1963, 6,035/63
5 Claims. (Cl. 251—334)

This invention relates to control valves. And in particular, it relates to an improvement in control valves of the type shown in my copending application Serial No. 258,875, filed February 15, 1963, of which this application is a continuation-in-part. According to said application, the valve member cooperating with the valve seat is in the form of a resilient valve disc which is curved about a diameter and of circular shape. The valve disc is actuated by a thrust plate on the valve stem so as to be held against the resiliency thereof by the thrust plate in contact with the seat around the whole circumference thereof, thereby tightening the mouth of the seat, while, upon removal of the pressure exerted by the thrust plate the valve disc initially breaks its contact with the seat around only a portion thereof. As a consequence of the said shape of the valve disc, when the valve disc is in a completely or partially opened position, the thrust plate will be in contact only with the marginal portions of the valve disc close to the circumference thereof, at points remote from the diameter about which the valve disc is curved. Since the circular valve disc shown in the said application is of a constant thickness, it has a higher degree of rigidity along the said diameter which rests on the seat (when the disc is partially or completely open) then in the said marginal portions resting against the thrust plate. Therefore, in the circular disc arrangement, when the pressure from the thrust plate is applied to the marginal portions to displace the disc towards the annular seat to close the valve, the less rigid marginal portions will move a certain distance toward the seat before the portion near the diameter in contact with the seat flattens to increase the extent of its contact with the seat. The effect of this lag in the flattening movement of the portion of the disc about the diameter is that the change in the size of the valve opening does not correspond as accurately and precisely as possible to the movement of the valve stem. Such precise correspondence is of course desirable to obtain the most accurate control of the valve opening.

The object of the present invention is to provide a more accurate and precise correspondence between the adjustment of the valve stem and the size of the valve opening. This is achieved according to the invention by making the valve disc of substantially constant thickness but reducing the rigidity of the valve disc in the area around the said diameter by providing a pair of opposed notches at the periphery of the disc at the ends of the said diameter, that is, in the area closest to the valve seat when the valve disc is partially or completely open.

Figure 2:
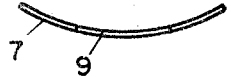
Figure 3:
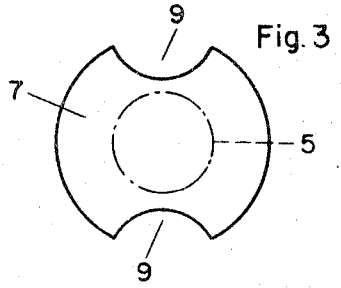
Figure 4:
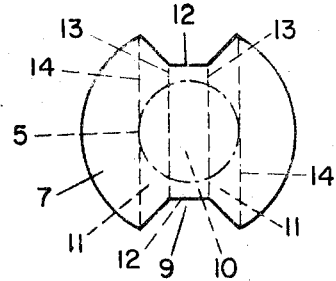

The invention is illustrated in some embodiments on the attached drawing. FIG. 1 is an axial section through a valve arranged according to the present invention. FIGS. 2 and 3 are a side view and a plan view, respectively, of a valve disc forming part of the FIG. 1 valve. FIG. 4 is a plan view of a modified form of valve disc.

The FIG. 1 valve, which is primarily intended for use in central heating plants, comprises a valve housing 1 having a cap 2 in which a threaded valve stem 3 is inserted. The valve stem carries at its inner end a rotatably mounted thrust plate 4 having a plane underside. Between an annular valve seat 5 having a valve opening 6 there is placed a resilient valve disc 7, which is curved about a diameter and may be of 0.15 millimeter stainless steel. The word "diameter" is used for convenience to describe a line through the portion of the disc lying approximately over the center of the area within the annular seat; and this word does not require that the disc necessarily be exactly circular in shape. In the valve opening 6 is placed a helical spring 8 exerting a pressure on the valve disc 7 and tending to unseat it from the seat 5.

FIGS. 2 and 3 show the valve disc 7 as being substantially circular and being curved about a diameter and having a pair of diametrically opposed notches 9 at the periphery of the disc at the ends of the said diameter, that is, the area closest to the seat when the valve is partially or completely open. The valve disc 7 thereby has its smallest rigidity in the portion lying between these notches 9. In this embodiment the notches are of circular shape.

In the embodiment shown in FIG. 4, the peripheral notches 9 are formed by substantially straight lines. The portion 10 of the valve disc 7 between the bottom edges 12 of the notch and the dashed boundary lines 13 have the same degree of rigidity throughout against pressure tending to flatten the valve disc. However, the portions 11 between dashed lines 13 and dashed lines 14 on each side of the portion 10 have a continuously increasing degree of rigidity away from the portion 10. Through a choice of contour of the peripheral notches 9 it is therefore possible to provide for the valve disc a desired type of variation of the rigidity. Also, the depth of the marginal notches that is, the length inwardly from the periphery along the said diameter, has some influence on the rigidity of the valve disc, but the depth must be small enough for the peripheral notches to always be outside of the area within the valve seat 5.

Though the invention has been described with considerable detail with respect to certain embodiments thereof, it should be apparent that variations and modifications are possible without departing from the spirit and scope of the present invention, limited only by the appended claims wherein:

What is claimed is:
1. A valve comprising an annular valve seat and a thrust plate in opposing relationship to said valve seat, a resilient valve disc member mounted in the valve between the said annular seat and the thrust plate and of such a size as to at least cover the opening within the annular seat, said disc being bent about one diameter towards the said thrust plate in its free state and resiliently movable to a flat shape, so that when the thrust plate is moved towards the annular seat the resilient disc flattens against the seat, and when the thrust plate is moved away from the annular seat the portions of the disc remote from the said diameter move away from the seat before the portions of the disc closer to the said diameter, and a pair of opposed notches in the said resilient disc at each end of the said diameter.

2. A valve as claimed in claim 1 wherein the said valve disc is of a constant thickness.

3. A valve as claimed in claim 1 wherein the edge of each notch in the said valve disc forms a continuous curve.

4. A valve as claimed in claim 1 wherein the edge of each notch is formed by straight lines.

5. A valve as claimed in claim 4 wherein the edge of each notch is formed by one straight edge substantially perpendicular to the said diameter, and two straight edges extending from the first said straight edge towards the periphery of the disc.

References Cited by the Examiner

UNITED STATES PATENTS

| 813,555 | 2/1906 | Hayden | 251—334 |
| 2,893,685 | 7/1959 | Van Camp | 251—334 |

FOREIGN PATENTS

| 204,897 | 1956 | Australia. |

M. CARY NELSON, *Primary Examiner.*

ARNOLD ROSENTHAL, *Assistant Examiner.*